(12) United States Patent
Kawamata

(10) Patent No.: US 6,334,140 B1
(45) Date of Patent: Dec. 25, 2001

(54) ELECTRONIC MAIL SERVER IN WHICH ELECTRONIC MAIL IS PROCESSED

(75) Inventor: Jiro Kawamata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/151,523

(22) Filed: Sep. 11, 1998

(30) Foreign Application Priority Data

Sep. 25, 1997 (JP) .................................................. 9-260257

(51) Int. Cl.[7] .......................... G06F 15/16; G06F 15/177
(52) U.S. Cl. ..................... 709/202; 709/203; 709/217; 709/219; 709/232; 707/500
(58) Field of Search .......................... 707/500; 709/202, 709/203, 206, 207, 232, 217, 219

(56) References Cited

U.S. PATENT DOCUMENTS

| | | | |
|---|---|---|---|
| 5,613,108 | * 3/1997 | Morikawa | 707/200 |
| 5,767,848 | * 6/1998 | Matsuzaki et al. | 345/331 |
| 5,790,116 | * 8/1998 | Malone et al. | 345/335 |
| 5,794,001 | * 8/1998 | Malone et al. | 345/342 |
| 5,877,759 | * 3/1999 | Bauer | 345/229 |
| 5,958,006 | * 9/1999 | Eggleston et al. | 709/219 |
| 6,073,142 | * 6/2000 | Geiger et al. | 707/500 |

FOREIGN PATENT DOCUMENTS

| | | |
|---|---|---|
| 4-178045 | 6/1992 | (JP) . |
| 5-120335 | 5/1993 | (JP) . |
| 6-97962 | 4/1994 | (JP) . |
| 7-273791 | 10/1995 | (JP) . |
| 8-149154 | 6/1996 | (JP) . |
| 9-130423 | 5/1997 | (JP) . |
| 9-200257 | 7/1997 | (JP) . |
| 9-219723 | 8/1997 | (JP) . |

OTHER PUBLICATIONS

Japanese Office Action, dated Dec. 6, 2000, with English language translation of Japanese Examiner's comments.

* cited by examiner

*Primary Examiner*—Mark H. Rinehart
*Assistant Examiner*—P Kang
(74) *Attorney, Agent, or Firm*—McGuireWoods LLP

(57) ABSTRACT

In order to achieve an aspect of the present invention, an electronic mail server includes a mail box, and an interface unit for receiving an electronic mail. A mail processing section analyzes the received electronic mail and applies to the received electronic mail a processing, which is determined based on the analyzing result and an instruction corresponding to the received electronic mail, to store the processed electronic mail in the mail box.

19 Claims, 6 Drawing Sheets

ELECTRONIC MAIL SERVER IN WHICH ELECTRONIC MAIL IS PROCESSED

BACKGROUND OF THE INVENTION

1. Field of the Invention

The present invention relates to an electronic mail (E-mail) server, and more particularly to an electronic mail server which applies, to an electronic mail, a process determined based on an instruction from an electronic mail recipient.

2. Description of the Related Art

A conventional electronic mail (E-mail) server has a function to analyze an electronic mail header to perform routing. For example, in Japanese Laid Open Patent Application (JP-A-Heisei 2-241241) is described an electronic mail server in which a mode is set to send back or transfer an electronic mail when an operator is absent such that the electronic mail server is possible to deliver received electronic mails.

However, the electronic mail server has only a function to change routing information. In order to take out a desired one of many electronic mails received by the electronic mail server, it is necessary that the electronic mail server transfers all the received electronic mails to an electronic mail receiving terminal and a user uses a function on the electronic mail receiving terminal.

Also, the electronic mail can be set with a priority in an electronic mail header. An electronic mall with a high priority is primarily received based on the priority. However, since a transmitter sets the priority to an electronic mail in a conventional electronic mail server system, the electronic mail is not always important to a recipient, even if the priority of the received electronic mail is high.

A first problem of the conventional electronic mail server system is in that the user cannot easily take out a desired one from among the many electronic mails received by the electronic mail server. The reason is that the number of electronic mails to be receive tends to increase more than the number of electronic mails to be transmitted because of a broadcasting function and a mailing list. Accordingly, when the many electronic mails are used, it becomes difficult to take out a necessary one from among the many electronic mails.

A second problem is in that a wasteful communication expenses is required in the dialup connection environment. This is because it is necessary that all the electronic mails delivered to the user are transferred to an electronic mail receiving terminal and then a filtering function of the electronic mail receiving terminal is used.

A third problem is in that if the electronic mail server is frequently accessed, there is a case that the mail box of the electronic mail server overflows so that the recipient cannot receive any electronic mails. This is because the electronic mail server stores received electronic mails in the mail box regardless of whether the each of the received electronic mails is necessary or unnecessary to the recipient.

In addition to the above reference, a destination control system in a server is known in Japanese Laid Open Patent Application (JP-A-Heisei 4-113740). In this reference, the server is composed of an electronic mail receiving section (15), an analyzing section (16) for analyzing the received electronic mail, and a manager section (14) including a distribution processing section (17) for distributing the received electronic mail into destinations based on the analyzing result. When a transmission request is received from a terminal, the manager automatically determines the terminal to distribute the received electronic mails.

Also, an apparatus for automatically limiting recipients of messages is described in Japanese Laid Open Patent Application (JP-A-Heisei 8-263404 corresponding to U.S. patent application Ser. No. 346,715 filed on Nov. 30, 1994). In this reference, a recipient specifying data is added to an electronic mail, so that the number of junk electronic mails can be decreased. The recipient specifying data of the electronic mail header is a non-address information which specifies a recipient who receives the electronic mail. That is, whether or not the electronic mail should be provided to the recipient is determined based on the non-address information of the electronic mail and information of the recipient.

However, the above problems cannot be solved by the above references.

SUMMARY OF THE INVENTION

The present invention is accomplished in view of the above problems. Therefore, an object of the present invention is to provide an electronic mail server system in which a use can easily take out a necessary one from among many electronic mails received by an electronic mail server.

In order to achieve an aspect of the present invention, an electronic mail server includes a mail box, and an interface unit for receiving an electronic mail. A mail processing section analyzes the received electronic mail and applies to the received electronic mail a processing, which is determined based on the analyzing result and an instruction corresponding to the received electronic mail, to store the processed electronic mail in the mail box.

The electronic mail server may further include a data base storing the instruction, and the mail processing section refers to the data base to acquire the instruction. Instead, the electronic mail server may further include a data base storing the instruction for each of recipients, and the mail processing section refers to the data base based on a recipient written in the received electronic mail to acquire the instruction. In this case, the data base may store the instructions common to the recipients in addition to the instruction for each of the recipients, and the mail processing section refers to the instructions common to the recipients and the instruction for each of the recipients stored in the data base based on a recipient written in the received electronic mail to acquire the instruction.

The interface unit divides the received electronic mail into an electronic mail header and an electronic mail main portion, and the mail processing section includes a header analyzing section, a mail main portion analyzing section, a processing section for determining a processing based on the analyzing result of at least one of the header analyzing section and the mail main portion analyzing section and an instruction corresponding to the received electronic mail, and for applying the determined processing to the received electronic mail to produce a processed electronic mail.

The mail processing section changes a priority of the received electronic mail based on the instruction and the analyzing result. In this case, the instruction instructs change of the priority of the received electronic mail based on a transmitter of the received electronic mail. Also, the interface unit sends back the received electronic mail when the changed priority indicates refusal of the received electronic mail.

The instruction may instruct production of a translation of the received electronic mail based on a language used in the received electronic mail. In this case, the mail processing section produces the translation of the received electronic mail, and stores the translation in the mail box together with the received electronic mail.

The instruction may instruct production of a summary of the received electronic mail. In this case, the mail processing section produces the summary of the received electronic mail, and stores the summary in the mail box together with the received electronic mail.

The instruction may instruct rewrite of a main portion of the received electronic mail. In this case, the mail processing section rewrites the main portion of the received electronic mail, and stores the rewritten electronic mail in the mail box.

The instruction may instruct change of a priority of at least one having the lowest priority of electronic mails already stored in the mail box when the mail box is full. In this case, the mail processing section changes the priority of at least one having the lowest priority of electronic mails already stored in the mail box, and changes the priority of the received electronic mail into refusal, and the interface unit sends back the received electronic mail when the changed priority indicates refusal of the received electronic mail.

Alternately, the instruction may instruct one having the lowest priority of electronic mails already stored in the mail box to be sent back when the mail box is full. In this case, the mail processing section detects and reads out one having the lowest priority of electronic mails already stored in the mail box, and stores the received electronic mail in the mail box, and the interface unit sends back the electronic mail having the lowest priority and read out from the mail box.

In addition, the instruction may instruct production of a summary of one having the lowest priority of electronic mails already stored in the mail box when the mail box is full. In this case, the mail processing section reads out the electronic mail having the lowest priority from the mail box, produces the summary of the read out electronic mail, stores the summary in the mail box, and then stores the received electronic mail in the mail box when an area of the mail box is sufficient for the received electronic mail.

In order to achieve another aspect of the present invention, a method of storing an electronic mail in mail server, includes the steps of:

receiving an electronic mail;

analyzing the received electronic mail;

referring to a data base based on a recipient of the received electronic mail to acquire an instruction from a mail box;

applying to the received electronic mail a processing, which is determined based on the analyzing result and an instruction corresponding to the received electronic mail to store the processed electronic mail in the mail box.

In order to achieve still another aspect of the present invention, an electronic mail server includes a mail box, and an interface unit for receiving an electronic mail. A mail processing section filters the receiving electronic mails based on an instruction corresponding to each of the received electronic mails and stores the filtered electronic mails in the mail box for transferring to an electronic mail receiving terminal.

DESCRIPTION OF THE PREFERRED EMBODIMENTS

Next, an electronic mail server system of the present invention will be described below in detail with reference to the attached drawings.

Figure 1:
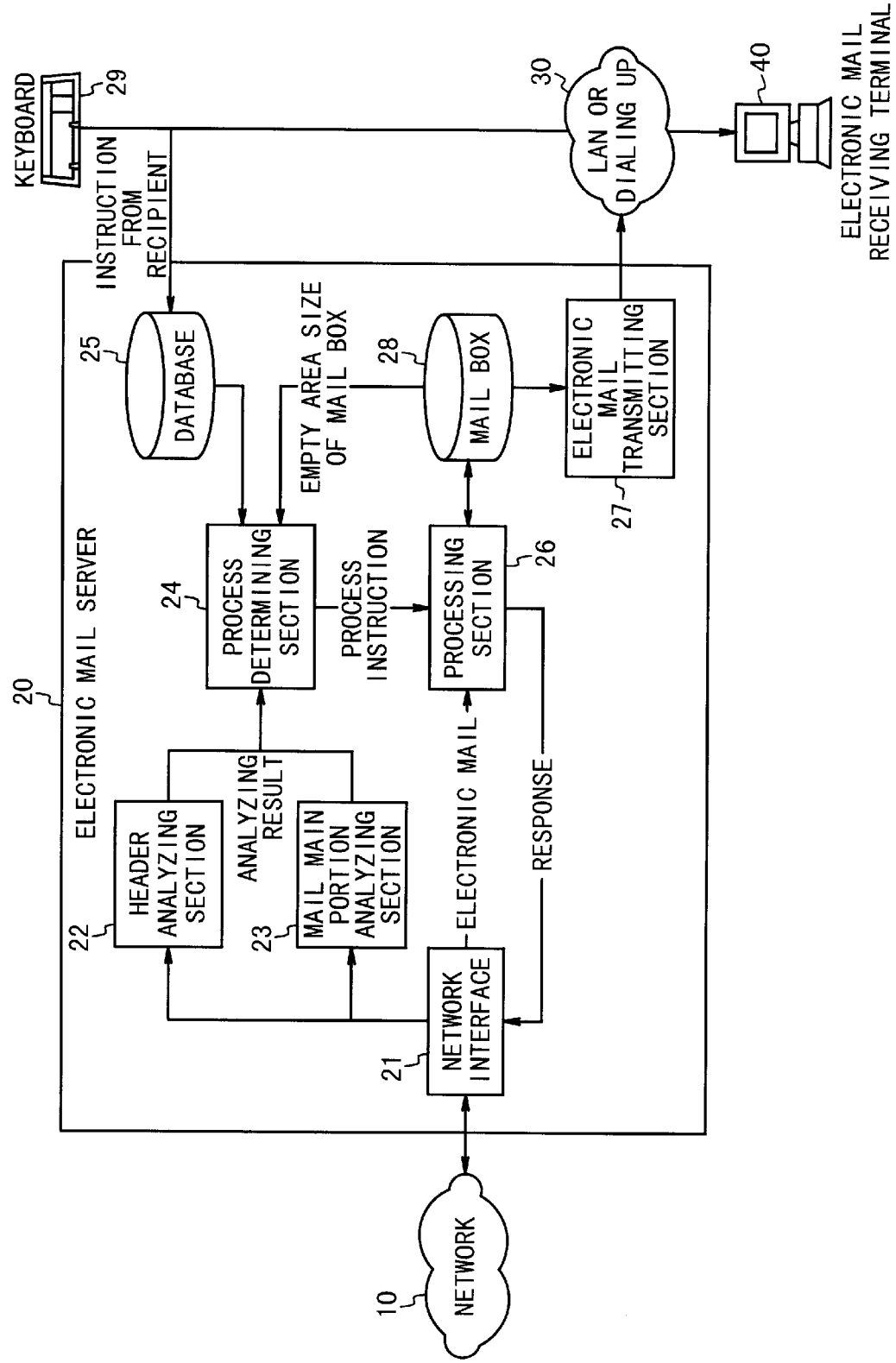
FIG. 1 is a block diagram illustrating the structure of an electronic mail server system of the present invention.

FIG. 1 is a block diagram illustrating the structure of the electronic mail server system of the present invention.

Referring to FIG. 1, the electronic mail server system of the present invention is composed of a network 10, an electronic mail server 20 and an electronic mail receiving terminal 40 with a keyboard 29. The electronic mail server 20 is composed of a network interface 21, a header analyzing section 22, a mail main portion analyzing section 23, a process determining section 24, a processing section 26, a database 25, a mail box 28, and an electronic mail transmitting section 27.

When receiving an electronic mail from the network 10, the network interface 21 transfers header information of the received electronic mail to the header analyzing section 22, and the main portion of the received electronic mail to the mail main portion analyzing section 23. A message content is written in the main portion of the electronic mail. Also, the network interface 21 transfers the received electronic mail to the 20 processing section 26.

The header analyzing section 22 analyzes the header information of the electronic mail transferred from the network interface 21, and sends the analyzing result to the process determining section 24. In the same way, the mail main portion analyzing section 23 analyzes the electronic mail main portion sent from the network interface 21, and the analyzing result to the process determining section 24.

The process determining section 24 and the processing section 26 filters the receiving electronic mails based on an instruction corresponding to each of the received electronic mails and storing the filtered electronic mails in the mail box before all the electronic mails are transferred to an electronic mail receiving terminal 40.

The process determining section 24 refers to an instruction previously stored in the data base 25 by an electronic mail recipient from the keyboard 29, the LAN or the dial-up 30, and an empty capacity of the mail box 28 and determines a process for the received electronic mail to output a process instruction to the processing section 26.

In this example, instructions are written in the data base 25 by a single recipient. However, the data base 25 may be shared by recipients. That is, instructions may be stored in the data base 25 for every recipient. Also, instructions common to the recipients are additionally stored in the data base 25. The process determining section 24 refers to the instructions in an area specific to the recipient of the electronic mail and the instructions in the common area to the recipients.

The processing section 26 rewrites the header and main portion of the received electronic mail supplied from the network interface 21 in accordance with the process instruction supplied from the process determining section 24. When the lowest priority is set as a result of the rewriting of the electronic mail header and an instruction to refuse the reception of the electronic mail refusal is received from the process determining section 24, the processing section 26 generates a sending-back instruction and outputs to the network interface 21 together with the received electronic mail. The network interface 21 sends back the electronic mail to the transmitter through the network 10 in response to the sending-back instruction. When the sending-back instruction is not received for the electronic mail, the processing section 26 stores the rewritten electronic mail in the mail box 28.

When an electronic mail transmission request is received from the electronic mail receiving terminal 40 via the LAN or dial-up 30, the electronic mail transmission section 27 takes out one or more electronic mails from the mail box 28 to transmit the taken out electronic mails to the electronic mail receiving terminal 40 via the LAN or dial-up 30.

Figure 2:
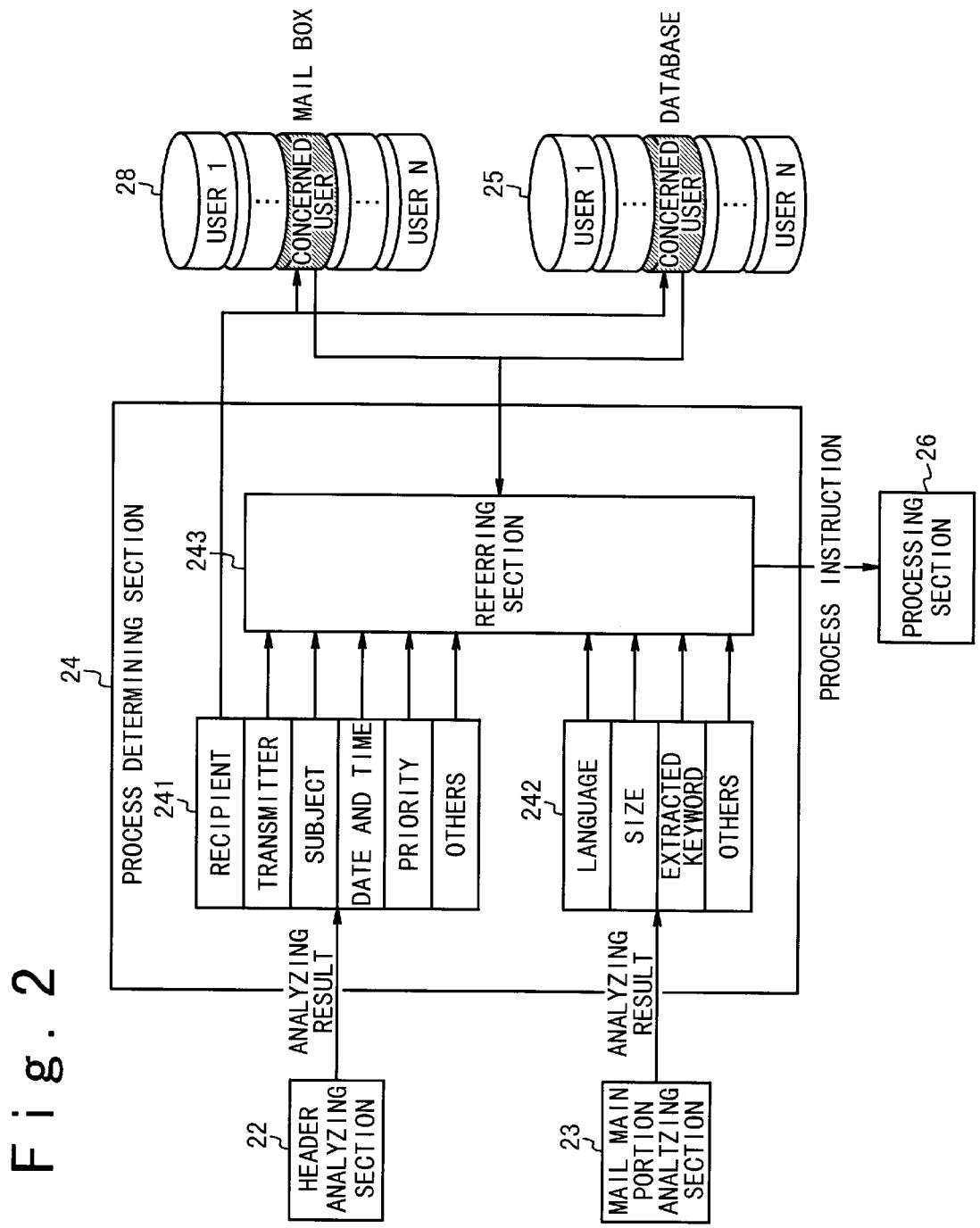
FIG. 2 is a block diagram illustrating the structure of a process determining section of the electronic mail server system of the present invention.

FIG. 2 is a block diagram illustrating the detailed structure of the process determining section 24 shown in FIG. 1. Referring to FIG. 2, the process determining section 24 will be described below.

In FIG. 2, the process determining section 24 is composed of a referring section 243. The process determining section 24 receives the analyzing result 241 from the header analyzing section 22 to transfer to the referring section 243, and receives the analyzing result 242 from the mail main portion analyzing section 23 to transfer to the referring section 243. The analyzing result 241 is composed of items of a recipient, a transmitter, a subject, a date and time, a priority and others. Also, the analyzing result 242 is composed of items of a language, a size, an extracted keyword and others.

The referring section 243 refers to the data base 25 based on the content of the recipient item of the analyzing result 241 to retrieve the instruction previously described by the recipient from the data base 25. Also, the referring section 243 refers to the mail box 28 based on the content of the recipient item of the analyzing result 241 to retrieve an empty area size concerned with the recipient from the mail box 28. Further, the referring section 243 determines the process for the received electronic mail based on the header analyzing result 241, the electronic mail main portion analyzing result 242, the instruction retrieved from the data base 25 and the empty area size of a recipient area of the mail box 28 to generate the process instruction to the processing section 26.

Figure 3:
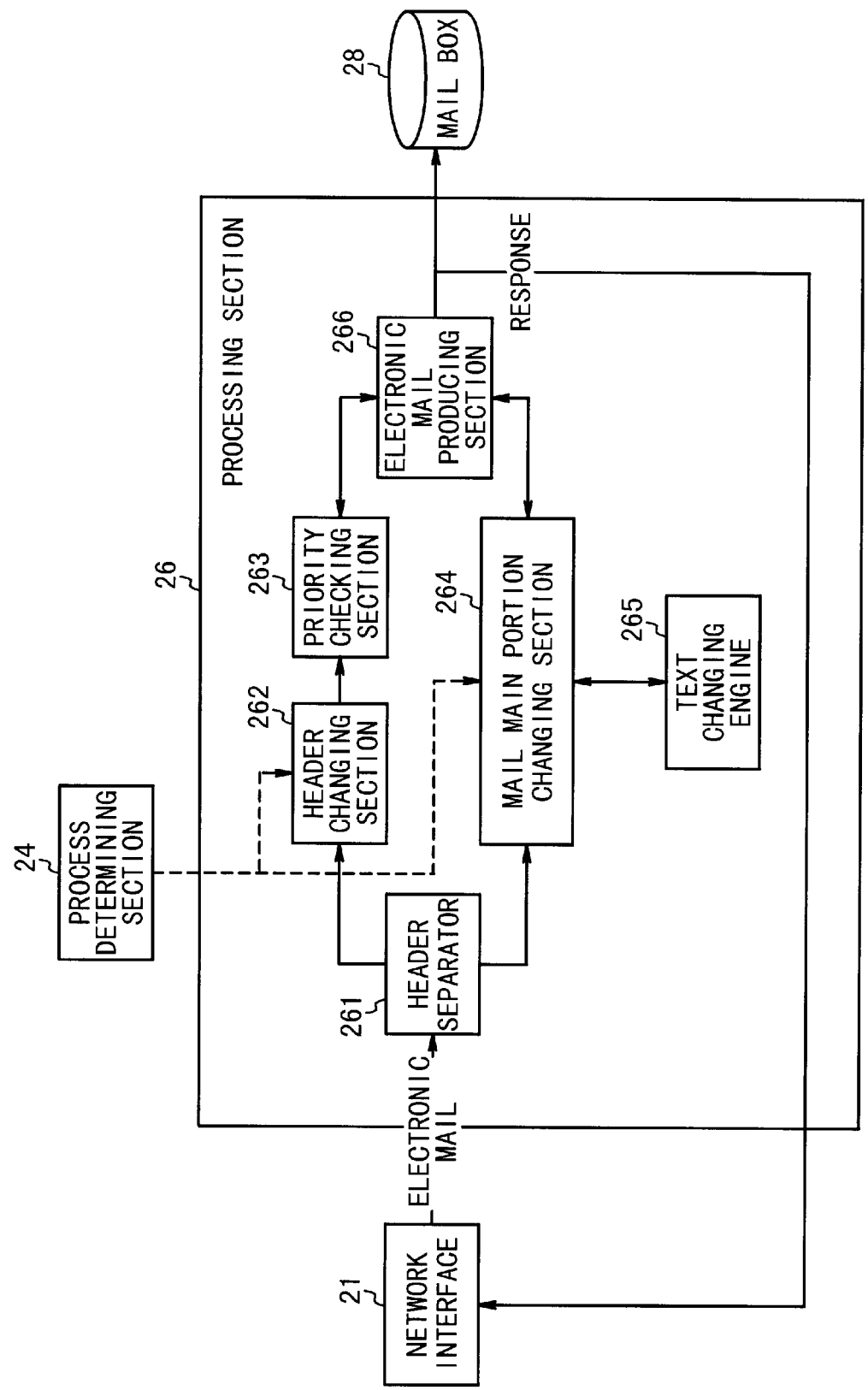
FIG. 3 is a block diagram illustrating the structure of a processing section of the electronic mail server system of the present invention.

FIG. 3 is a block diagram illustrating the detailed structure of the processing section 26 shown in FIG. 1. Referring to FIG. 3, the processing section 26 will be described below.

In FIG. 3, the processing section 26 is composed of a header separator 261, a header changing section 262, a priority checking section 263, a mail main portion changing section 264, a text changing engine 265, and an electronic mail producing section 266.

The header separator 261 separates the electronic mail received from the network interface 21 into an electronic mail main portion and an electronic mail header to output the electronic mail header to the header changing section 262 and the electronic mail main portion to the mail main portion changing section 264.

The header changing section 262 changes the header information in accordance with the instruction supplied from the process determining section 24 and the changing result to the priority checking section 263. The priority checking section 263 checks the priority of the changing result by the header changing section 262. As the result of the changing result of the header information, when the priority is the lowest value, i.e., reception refusal, the priority checking section 263 sends the header information to the electronic mail producing section 266 with the sending-back instruction.

Also, the mail main portion changing section 264 changes the mail main portion in accordance with the instruction supplied from the process determining section 24. When the instruction supplied from the process determining section 24 is an instruction to process a text such as a translation producing instruction and a summary producing instruction, the mail main portion changing section 264 processes the electronic mail main portion using the text processing engine 265. The translation or summary may be sent to the electronic mail producing section 266 singly or together with the electronic mail main portion. The processed electronic mail main portion is outputted to the electronic mail producing section 266.

The electronic mail producing section 266 produces an electronic mail from the header information supplied from the priority checking 263 and the electronic mail main portion supplied from the mail main portion changing section 264. However, the electronic mail producing section 266 generates the sending-back instruction to the network interface 21 when the processed electronic mail is to be sent back as the result of the priority check. When the processed electronic mail is a normal electronic mail for which the sending-back instruction is not generated, the processed electronic mail is stored in the mail box 28. When the mail box 28 lacks in the empty area size, an electronic mail with the lowest priority in the mail box is selected as the electronic mail to be sent back object and is transferred to the network interface 21. Thus, the sending-back process of the electronic mail is performed.

Figure 4:
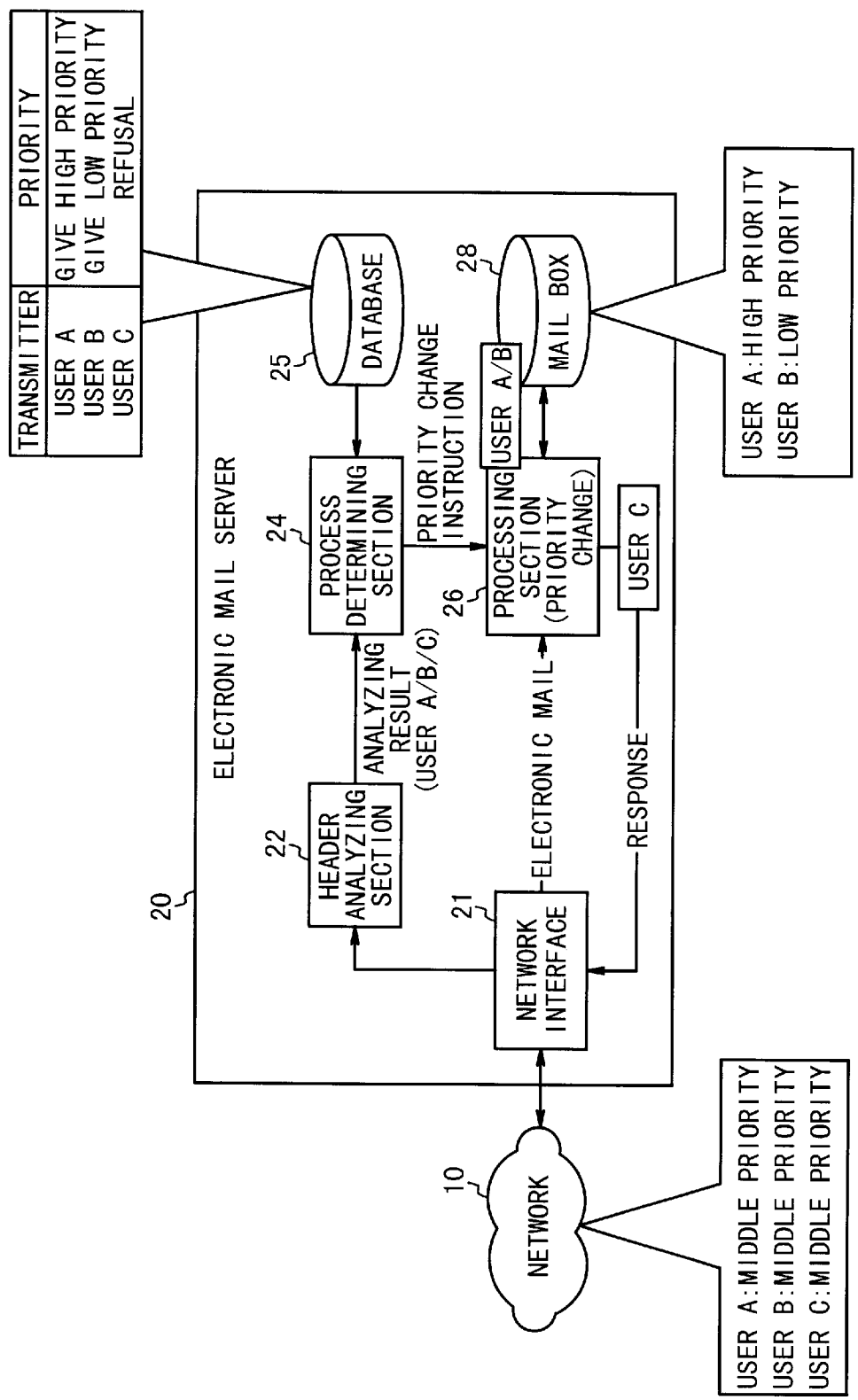
FIG. 4 is a block diagram illustrating the operation of the electronic mail server system according to a first embodiment of the present invention.

Next, the operation of the electronic mail server system will be described below in detail. FIG. 4 is a block diagram illustrating the electronic mail server system according to the first embodiment of the present invention. The case where the priority which is contained in an electronic mail header is rewritten in the electronic mail server system in the first embodiment will be described.

It is supposed that the following matters are set in the data base 25, "an electronic mail from a user A is given a high priority", "an electronic mail from a user B is given a low priority", and "an electronic mail from a user C is given the lowest priority to refuse the reception of the electronic mail". It should be noted in this example that the priority levels are 4 kinds of "high", "middle", "low" and "reception refusal" levels. However, the number of priority levels is not limited to 4.

It is considered that the electronic mails having the priority level of "middle" are received from the user A, user B and user C through the network 10. In this case, the network interface 21 transmits the header information of each of the electronic mails to the header analyzing section 22. The header analyzing section 22 analyzes the header information to detect the priority level, the recipient and transmitter of the electronic mail. The header analyzing section 22 outputs the analyzing result to the process determining section 24. The process determining section 24 refers to the data base based on the recipient to generate the process instruction to the electronic mail based on the description in the data base 25. That is, when the sender of the electronic mail is the user A, the priority level of the electronic mail is risen to a "high" level. When the sender of the electronic mail is the user B, the priority level of the electronic mail is fallen to a "low" level. When the sender of the electronic mail is the user C, the priority level of the electronic mail is fallen to the "lowest" level such that the reception of the electronic mail is refused.

The processing section 26 changes the priority levels of the electronic mails from the user A and the user B and stores in the mail box 28. However, the processing section 26 sends back the electronic mail from the user C to the network interface 21, because the reception refusal is previously set.

Figure 5:
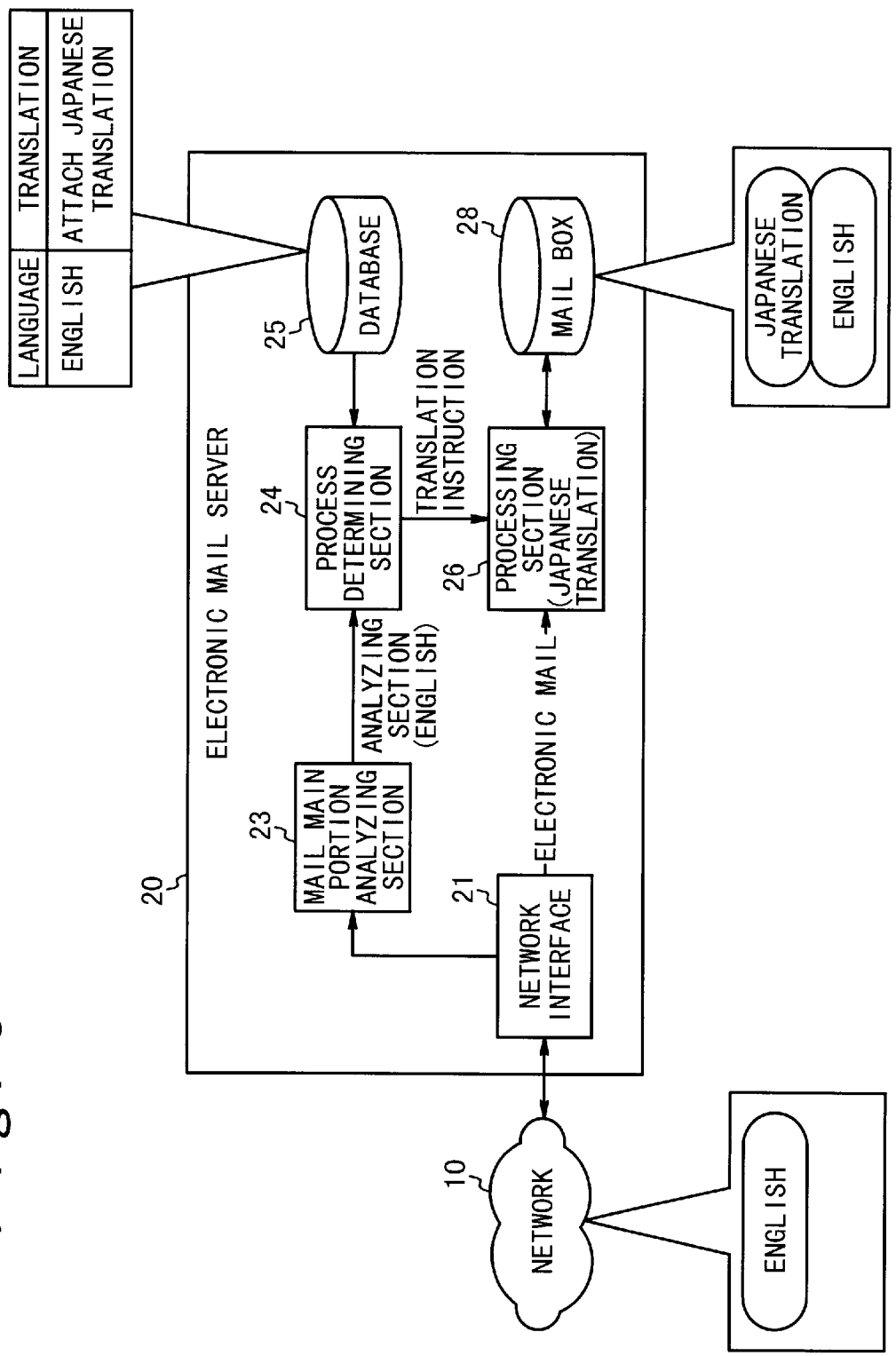
FIG. 5 is a block diagram illustrating the operation of the electronic mail server system according to a second embodiment of the present invention.

FIG. 5 is a block diagram illustrating the operation of the electronic mail server system in the second embodiment of the present invention. In this example, the case will be described in which the electronic mail main portion is translated so as to rewrite the electronic mail.

It is supposed that the following matter is set in the data base 25, "a Japanese translation of an English electronic mail is to be produced.".

When the English electronic mail arrives through the network 10, the network interface 21 sends the main portion of the arrived electronic mail to the electronic mail main portion analyzing section 23. The electronic mail main portion analyzing section 23 analyzes the main portion of the electronic mail to detect a used language. The electronic mail main portion analyzing section 23 sends the analyzing result to the process determining section 24. The process determining section generates a process instruction to the processing section 26 based on the description in the data base 25 such that the processing section 26 adds a Japanese translation. The processing section 26 translates the arrived electronic mail to produce the Japanese translation and stores the English electronic mail in the mail box 28 together with the Japanese translation. However, only the Japanese translation may be stored in the bail box 28 without storing the English electronic mail. Thus, the mail box 28 can be effectively used.

Figure 6:
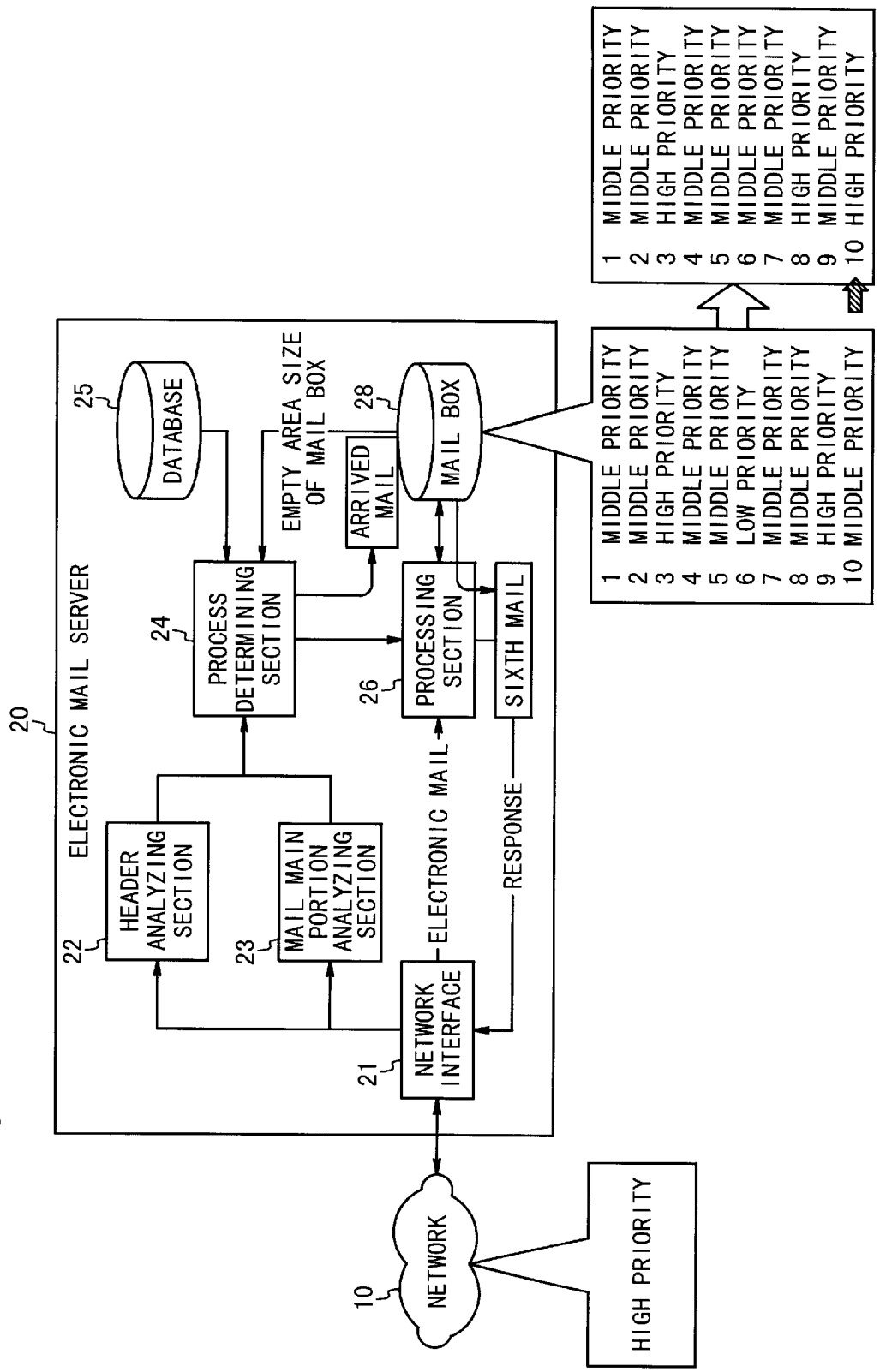
FIG. 6 is a block diagram illustrating the operation of the electronic mail server system according to a third embodiment of the present invention.

FIG. 6 is a block diagram illustrating the operation of the electronic mail server system according to the third embodiment of the present invention. In this example, the operation when the empty area size of the mail box is insufficient.

It is supposed that the capacity of the mail box 28 is limited to 10, and that electronic mails are already stored in the mail box 28 so that another electronic mail cannot be stored in the mail box 28. In this case, when an electronic mail having the "high" priority level is received from the network 10, the network interface 21 sends the electronic mail header to the header analyzing section 22 and the electronic mail main portion to the electronic mail main portion analyzing section 23, as in the first and second embodiments. The header analyzing section 22 and the electronic mail main portion analyzing section 23 send the analyzing results to the process determining section 24. When a sufficient empty area size is not in the mail box 28, the process determining section 24 compares the priority level of the received electronic mail and the priority level of each of all the electronic mails which are already stored in the mail box 28. As a result, when the priority level of the received electronic mail is the lowest, the process determining section 24 generates a process instruction to the processing section to send back the received electronic mail. However, when the priority level of the received electronic mail is "high", the processing section 28 takes out the sixth electronic mail having the lowest one of the priority levels of the electronic mails which are already stored in the mail box 28, as shown in FIG. 6. The processing section 28 sends back the sixth electronic mail to the network interface 21 and then stores the received electronic mail in the mail box 28.

In the third embodiment of the present invention, the case is described in which the priority level is not changed in the process determining section 24. However, when the priority level is changed in the process determining section 24, the priority level of the received electronic mail after the change may be compared with the priority level of each of the electronic mails stored in the mail box 28.

When the mail box 28 is full, the process determining section 24 may read out the ones of the electronic mails stored in the mail box 28 which have the priorities lower than the priority of the received electronic mail and the processing section may change the priority levels of the read out electronic mails to have the priority higher than the priority level of the received electronic mail. In this case, the received electronic mail is sent back to the network interface 21.

Also, there would be a case where the capacity of the mail box 28 is limited based on not the number of electronic mails but the file capacity. In such a case, the process determining section 24 may take out an electronic mail with the largest file size from the mail box 28. The process determining section 24 may summarize the taken out electronic mail to store the summarized electronic mail in the mail box 28 again, or may send back the taken out electronic mail to the network interface 21.

As described above, according to the present invention, the electronic mail necessary for the recipient can be easily taken out. This is because the electronic mail server performs a filtering function before transfer of the received electronic mails to the recipient such that the header or main portion of the received electronic mail is rewritten or edited in accordance with the instruction previously set in the data base 25, or a new text is produced in accordance with the instruction.

Also, wasteful communication expense can be reduced in the environment which the electronic mail server is accessed through the dial-up. This is because a necessary electronic mail is chosen on the electronic mail server and unnecessary electronic mails are sent back. Further, there is less risk that the mail box of the electronic mail server overflows, even if the electronic mail server is not frequently accessed. This is because when the sufficient empty area does not remain in the mail box, the electronic mail with the lowest priority level is sent back.

Further, there is less risk that the mail box of the electronic mail server overflows, even if the electronic mail server is not frequently accessed. This is because when the sufficient empty area does not remain in the mail box, the electronic mail with the lowest priority level is sent back.

What is claimed is:

1. An electronic mail server comprising:

a mail box;

an interface unit for receiving an electronic mail; and a mail processing section for analyzing the received electronic mail and for applying to the received electronic mail a processing, the processing being determined based on the analyzing result and an instruction which is provided by a recipient identified in the electronic mail and corresponding to the received electronic mail, the mail box storing the processed electronic mail, wherein said instruction instructs one having a lowest priority of electronic mails already stored in said mail box to be sent back when said mail box is full, wherein said mail processing section detects and reads out one having the lowest priority of electronic mails already stored in said mail box, and stores the received electronic mail in said mail box, and wherein said interface unit sends back the electronic mail having the lowest priority and read out from said mail box.

2. An electronic mail server according to claim 1, further comprising a data base storing said instruction, and said mail processing section refers to said data base to acquire said instruction.

3. An electronic mail server according to claim 1, further comprising a data base which interacts with said receiving section, said data base storing said instruction received by each recipient, and said mail processing section refers to said data base based on a recipient identification written in the received electronic mail to acquire said instruction.

4. An electronic mail server according to claim 3, wherein said data base stores said instructions common to the each recipient in addition to said instruction for each recipient, and said mail processing section refers to said instructions common to the each recipient and said instruction for each recipient stored in said data base based on a recipient identification written in the received electronic mail to acquire said instruction.

5. An electronic mail server according to claim 1, wherein said interface unit divides the received electronic mail into an electronic mail header and an electronic mail main portion, and wherein said mail processing section includes:
a header analyzing section for analyzing the electronic mail header;
a mail main portion analyzing section for the electronic mall main portion; and
a processing section for determining a processing based on the analyzing result of at least one of said header analyzing section and said mail main portion analyzing section and an instruction corresponding to the received electronic mail, and for applying the determined processing to the received electronic mail to produce a processed electronic mail.

6. An electronic mail server according to claim 1, wherein said mail processing section changes a priority of the received electronic mail based on said instruction and the analyzing result.

7. An electronic mail server according to claim 6, wherein said instruction instructs change of the priority of the received electronic mail based on a transmitter of the received electronic mail.

8. An electronic mail server according to claim 1, wherein said instruction instructs production of a translation of the received electronic mail based on a language used in the received electronic mail, and wherein said mail processing section produces the translation of the received electronic mail, and stores the translation in said mail box together with the received electronic mail.

9. An electronic mail server according to claim 1, wherein said instruction instructs production of a summary of the received electronic mail, and wherein said mail processing section produces the summary of the received electronic mail, and stores the summary in said mail box together with the received electronic mail.

10. An electronic mail server according to claim 1, wherein said instruction instructs rewrite of a main portion of the received electronic mail, and wherein said mail processing section rewrites the main portion of the received electronic mail, and stores the rewritten electronic mail in said mail box.

11. An electronic mail server according to claim 1, wherein said instruction instructs production of a summary of one having the lowest priority of electronic mails already stored in said mall box when said mail box is full, wherein said mail processing section reads out the electronic mail having the lowest priority from said mail box, produces the summary of the read out electronic mail, stores the summary in said mail box, and then stores the received electronic mail in said mail box when an area of said mail box is sufficient for the received electronic mail.

12. A method of storing an electronic mail in mail server, comprising the steps of:

receiving an electronic mail;

analyzing the received electronic mail;

referring to a data base based on a recipient of the received electronic mail to acquire an instruction from a mail box which is provided by the recipient identified in the received electronic mail;

instructing one having a lowest priority of electronic mails already stored in said mail box to be sent back when said mail box is full;

detecting and reading out one having the lowest priority of electronic mails already stored in said mail box, and storing the received electronic mail in said mail box; and sending back the electronic mail having the lowest priority and reading out from said mail box.

13. A method according to claim 12, wherein said data base stores said instruction for each recipient.

14. A method according to claim 13, wherein said data base stores said instructions common to the recipient in addition to said instruction for each recipient.

15. A method according to claim 12, wherein said processing is applied to an electronic mail header.

16. A method according to claim 12, wherein said processing is applied to an electronic mail main portion.

17. An electronic mail server comprising:

a mail box;

an interface unit for receiving an electronic mail; and a mail processing section for analyzing the received electronic mail and for applying to the received electronic mail a processing, the processing being determined based on the analyzing result and an instruction which is provided by a recipient identified in the electronic mail and corresponding to the received electronic mail, the mail box storing the processed electronic mail, wherein said mail processing section changes a priority of the received electronic mail based on said instruction and the analyzing result, and wherein said interface unit sends back the received electronic mail when the changed priority indicates refusal of the received electronic mail.

18. An electronic mail server comprising:

a mail box;

an interface unit for receiving an electronic mail; and a mail processing section for analyzing the received electronic mail and for applying to the received electronic mail a processing, the processing being determined based on the analyzing result and an instruction which is provided by a recipient identified in the electronic mail and corresponding to the received electronic mail, the mail box storing the processed electronic mail, wherein said instruction instructs change of a priority of at least one having the lowest priority of electronic mails already stored in said mail box when said mail box is full, and wherein said mail processing section changes the priority of at least one having the lowest priority of electronic mauls already stored in said mail box, and changes the priority of the received electronic mail into refusal, and wherein said interface unit sends back the received electronic mail when the changed priority indicates refusal of the received electronic mail.

19. An electronic mail server comprising:

a mail box;

an interface unit for receiving an electronic mail; and a mail processing section for filtering the receiving electronic mails based on an instruction which is provided by a recipient identified in the received electronic mail and corresponding to each of the received electronic mails and for storing the filtered electronic mails in said mail box for transferring to an electronic mail receiving terminal, wherein said instruction instructs one having a lowest priority of electronic mails already stored in said mail box to be sent back when said mail box is full, wherein said mail processing section detects and reads out one having the lowest priority of electronic mails already stored in said mail box, and stores the received electronic mail in said mail box, and wherein said interface unit sends back the electronic mail having the lowest priority and read out from said mail box.

* * * * *